June 22, 1965 J. A. CIAIO 3,189,946
APPARATUS FOR PREFORMING SHOE UPPER PARTS
BY INJECTION MOLDING PRINCIPLES
Original Filed Dec. 26, 1956 14 Sheets-Sheet 1

INVENTOR.
JOSEPH A. CIAIO

BY Percy Freeman
ATTORNEY

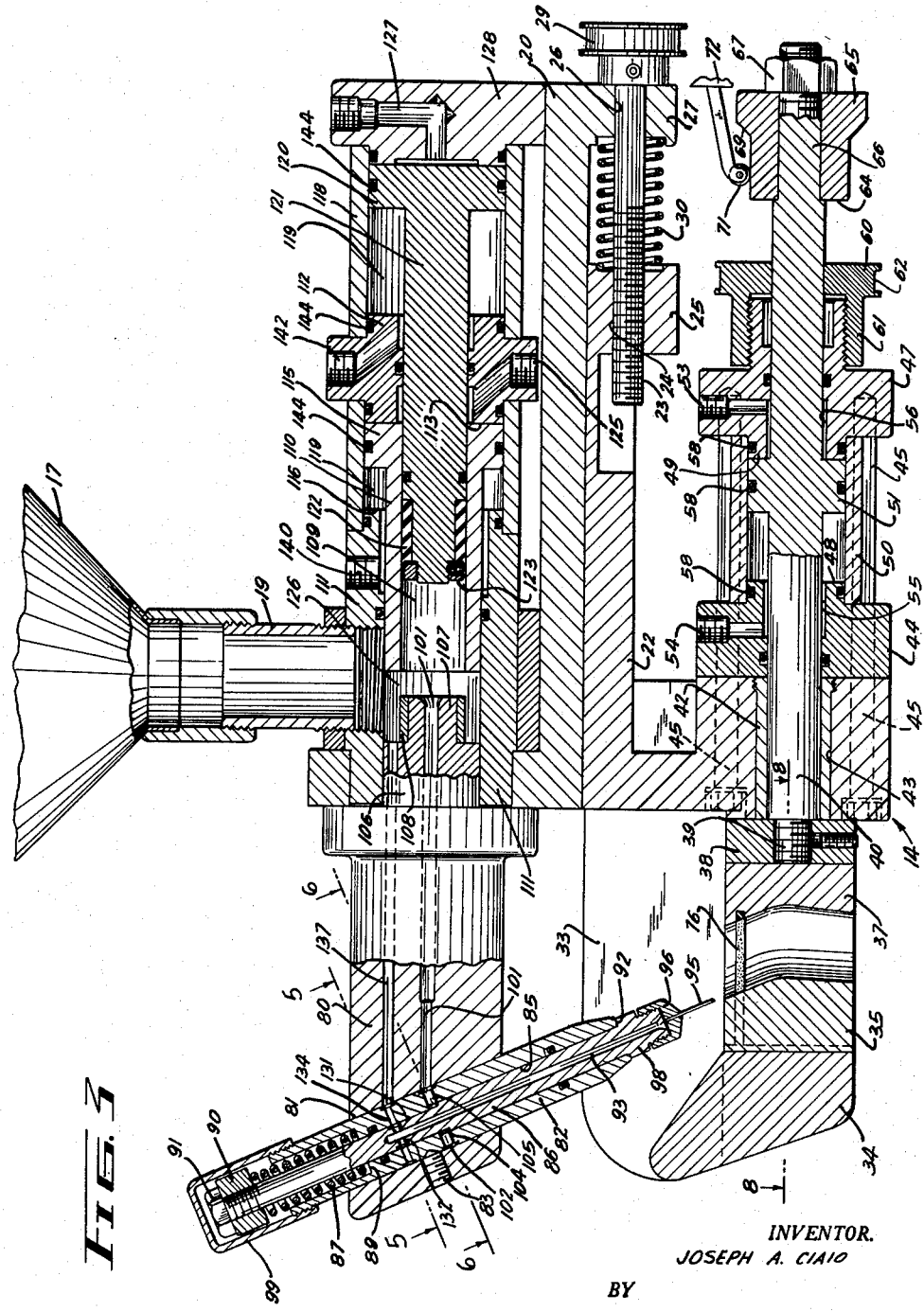

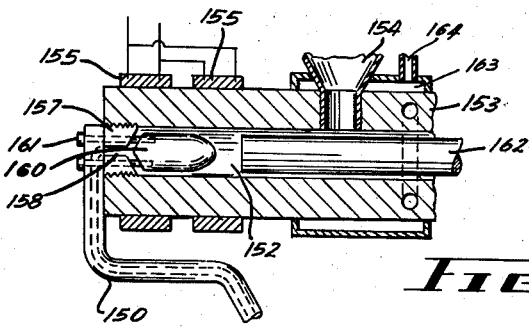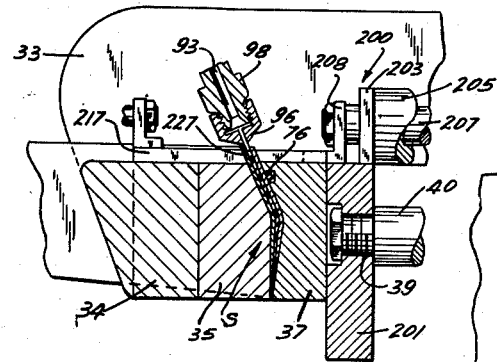

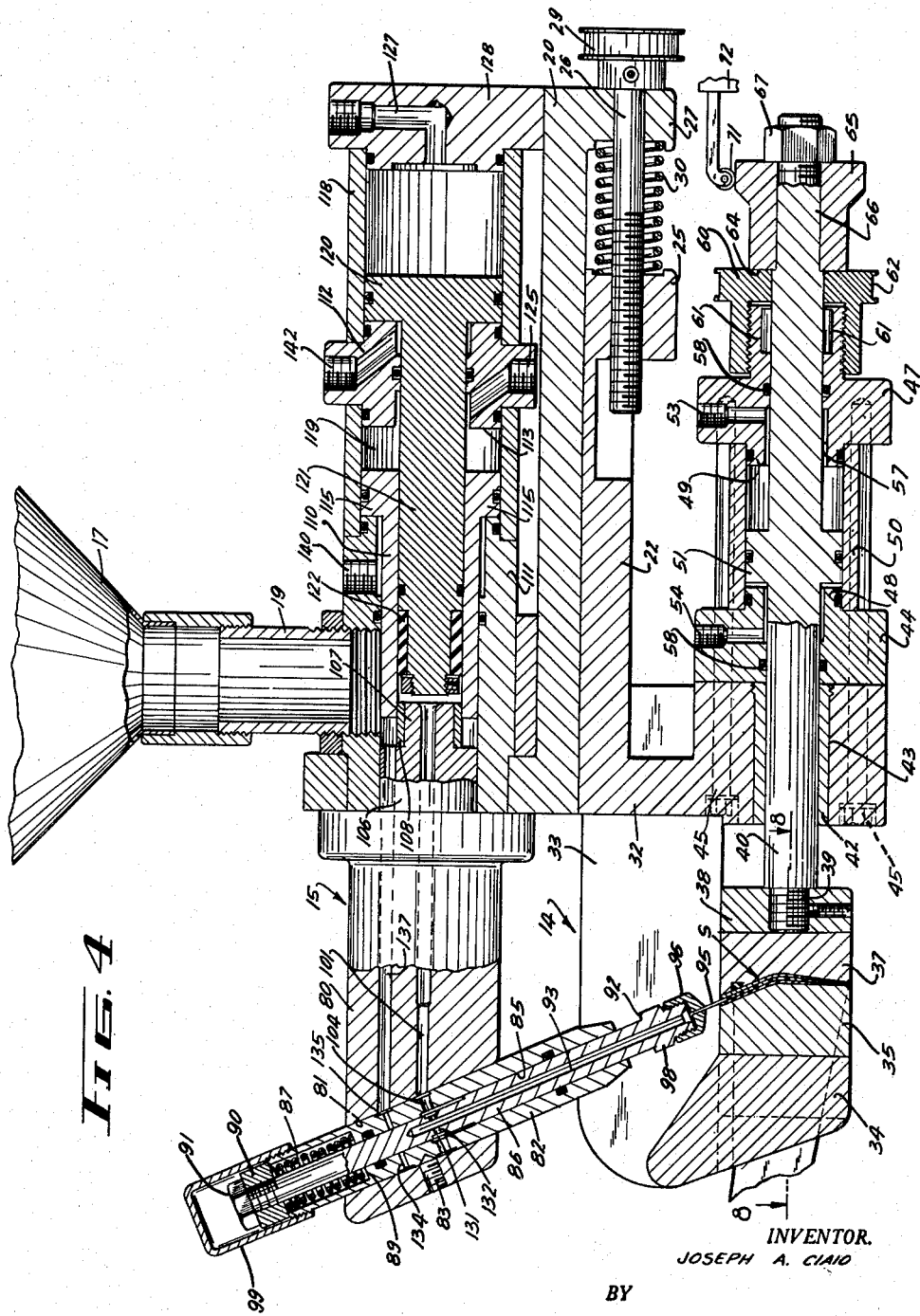

INVENTOR.
JOSEPH A. CIAIO
BY
Percy Truman
ATTORNEY

June 22, 1965  J. A. CIAIO  3,189,946
APPARATUS FOR PREFORMING SHOE UPPER PARTS
BY INJECTION MOLDING PRINCIPLES
Original Filed Dec. 26, 1956  14 Sheets-Sheet 6
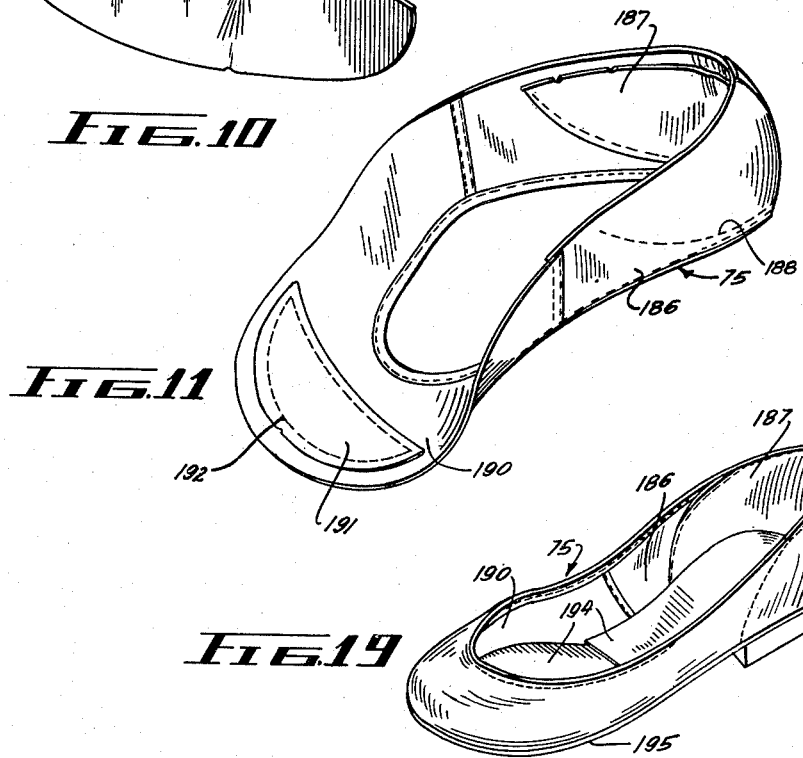
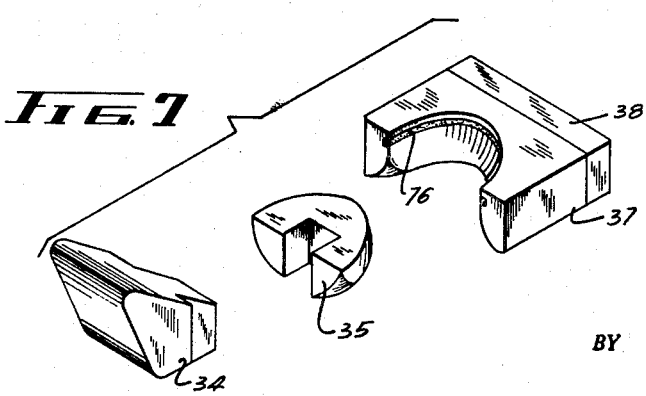
INVENTOR.
JOSEPH A. CIAIO
BY
*Percy Freeman*
ATTORNEY

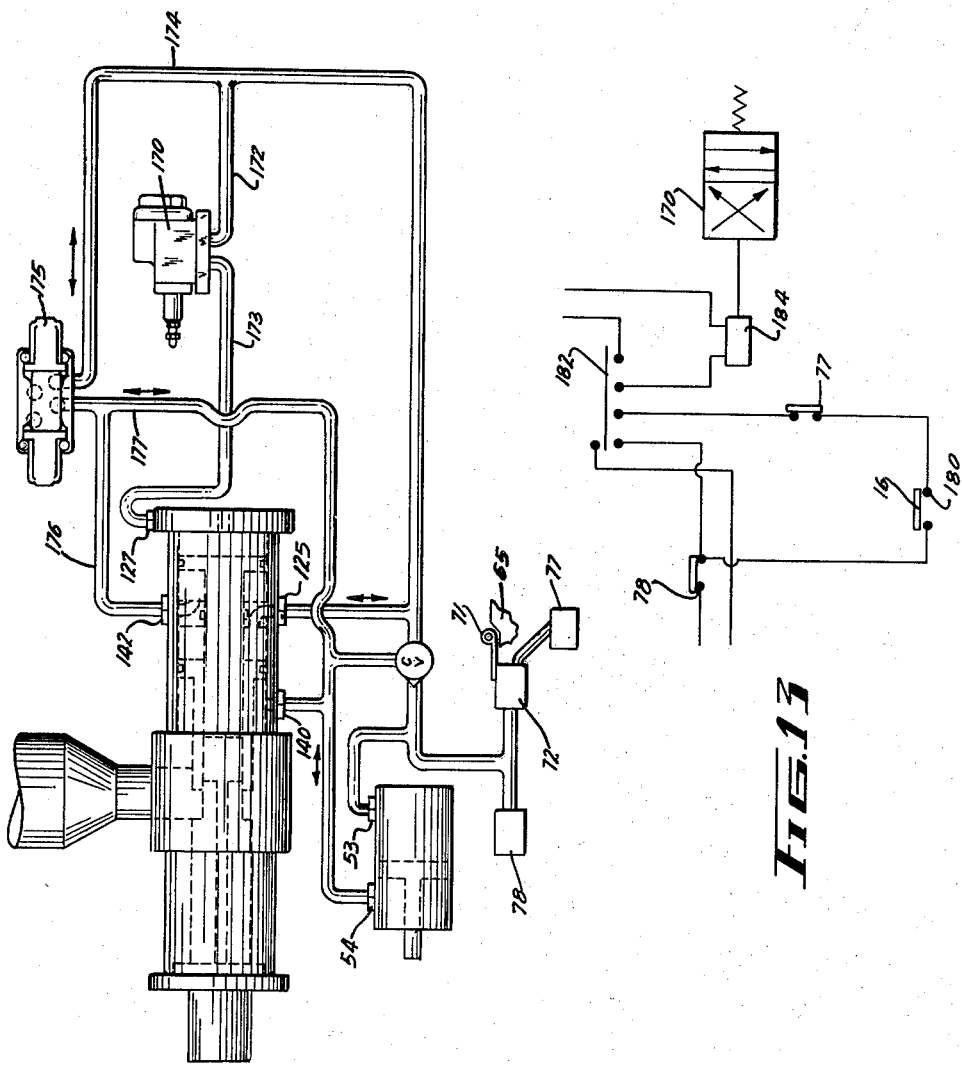

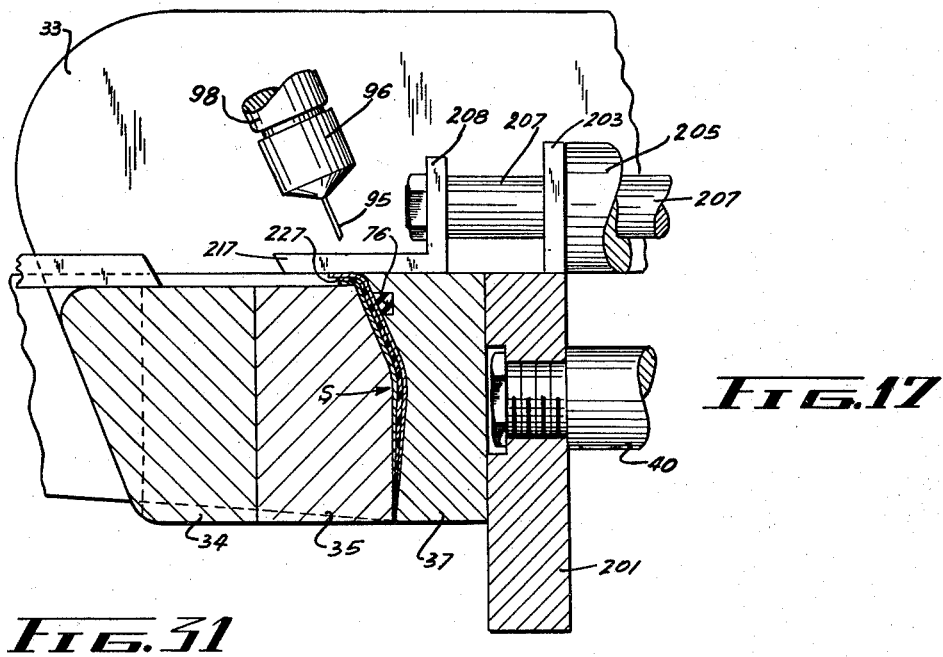
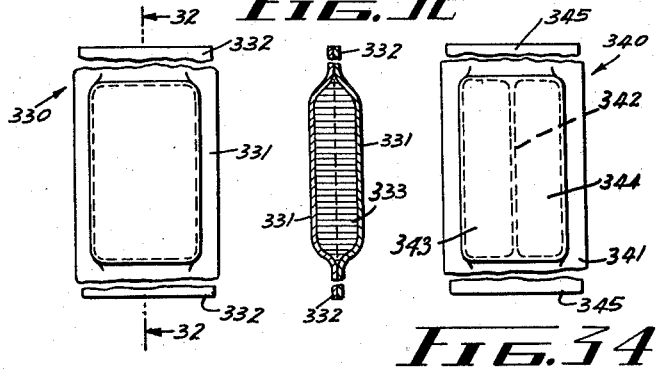
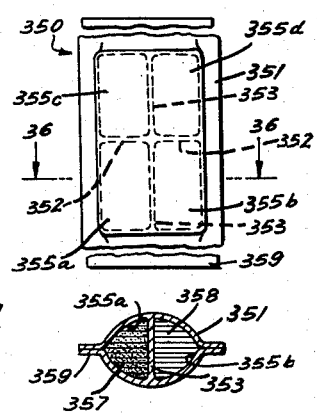
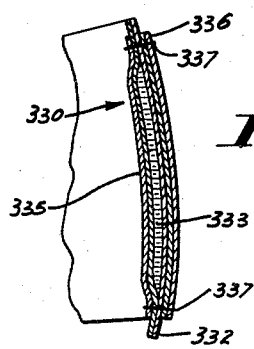

June 22, 1965 J. A. CIAIO 3,189,946
APPARATUS FOR PREFORMING SHOE UPPER PARTS
BY INJECTION MOLDING PRINCIPLES
Original Filed Dec. 26, 1956 14 Sheets-Sheet 9

INVENTOR.
JOSEPH A. CIAIO
BY
Percy Freeman
ATTORNEY

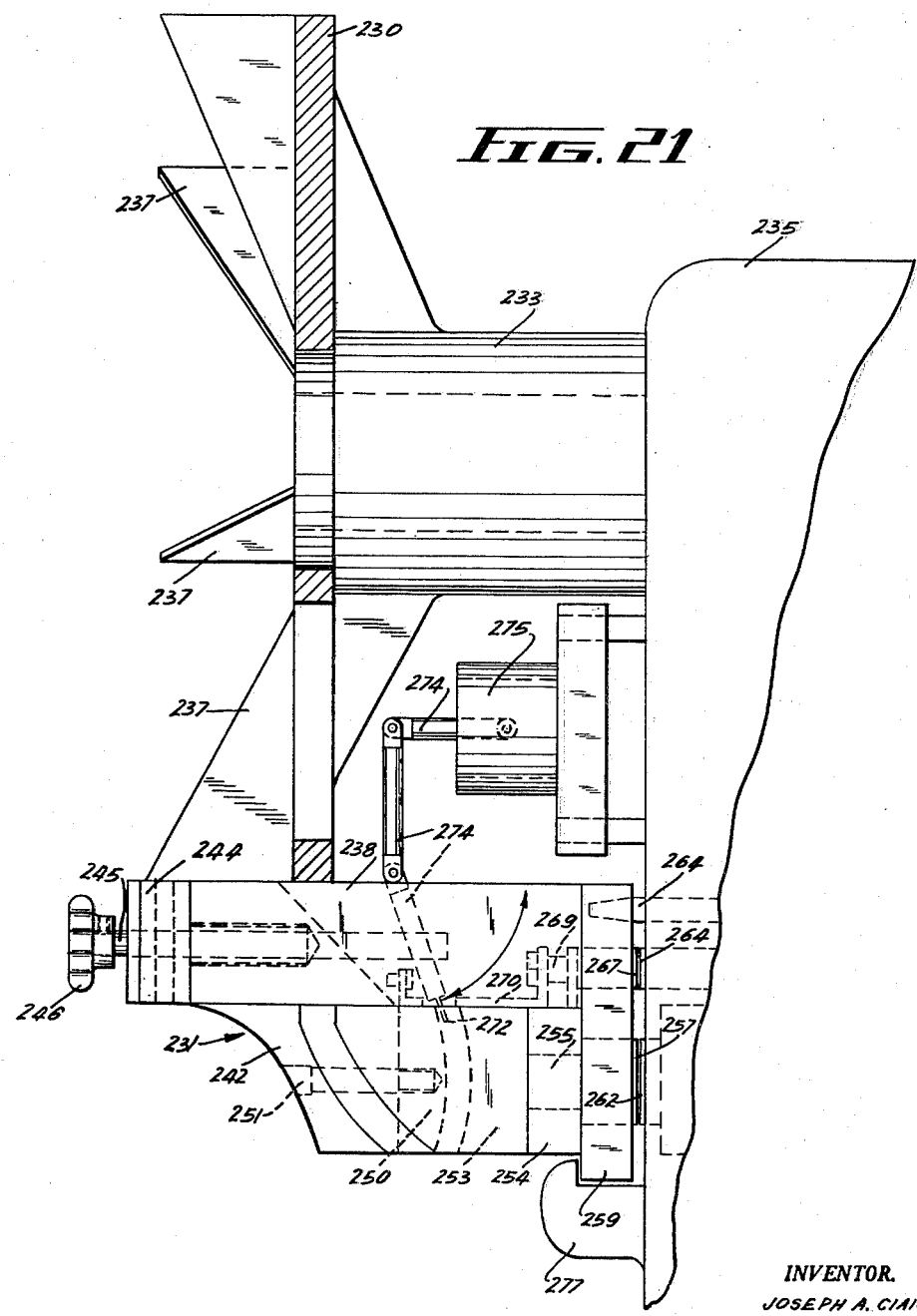

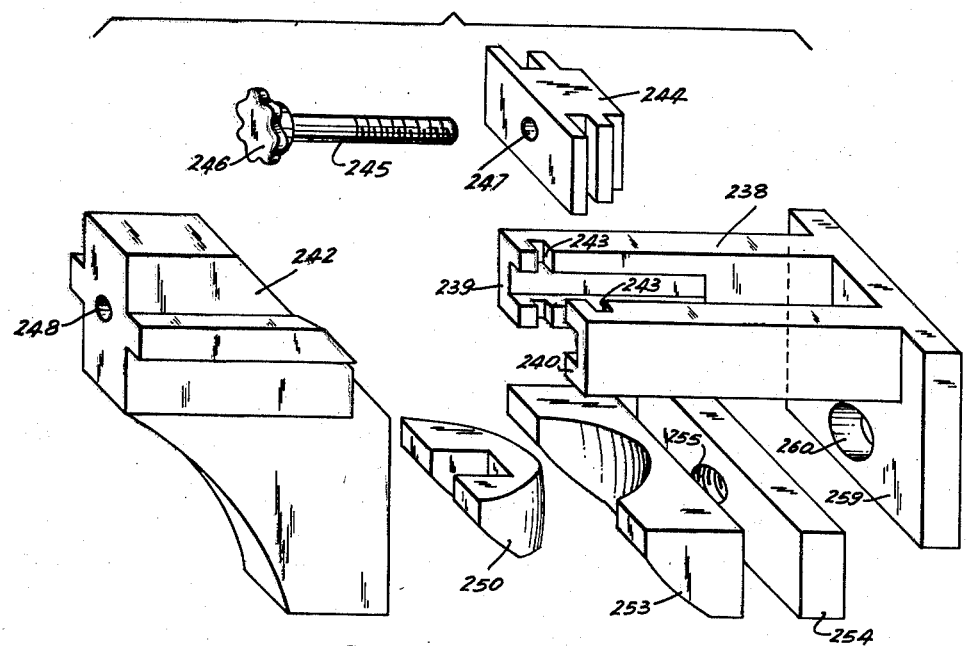
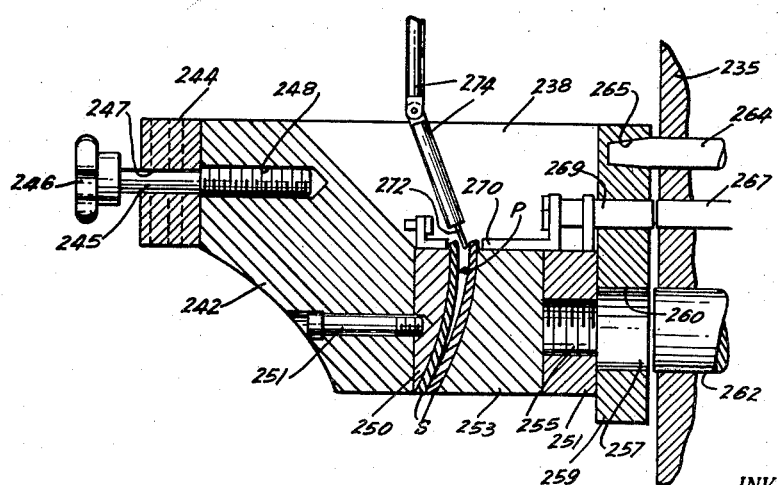

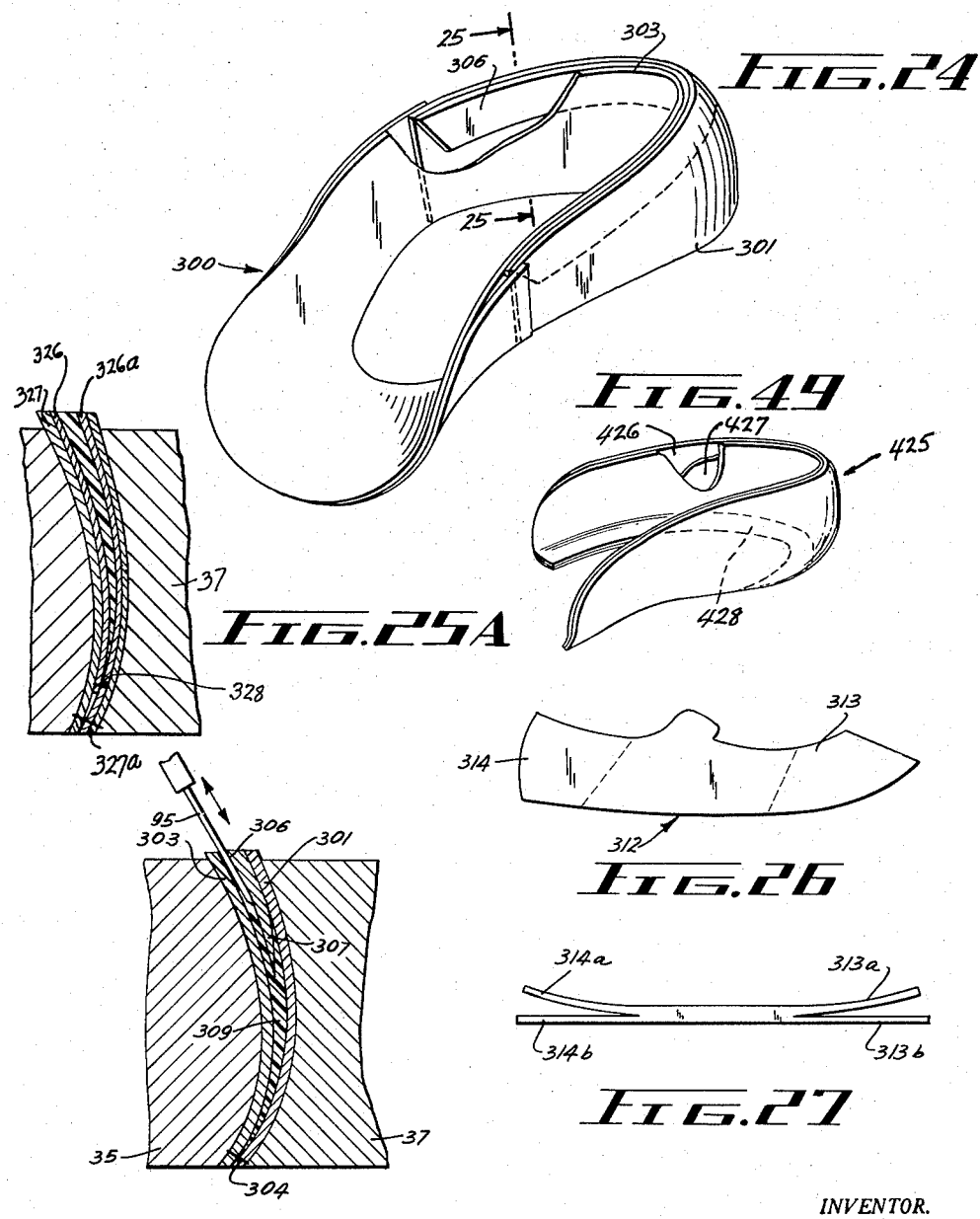

INVENTOR.
JOSEPH A. CIAIO
BY
Percy Freeman
ATTORNEY

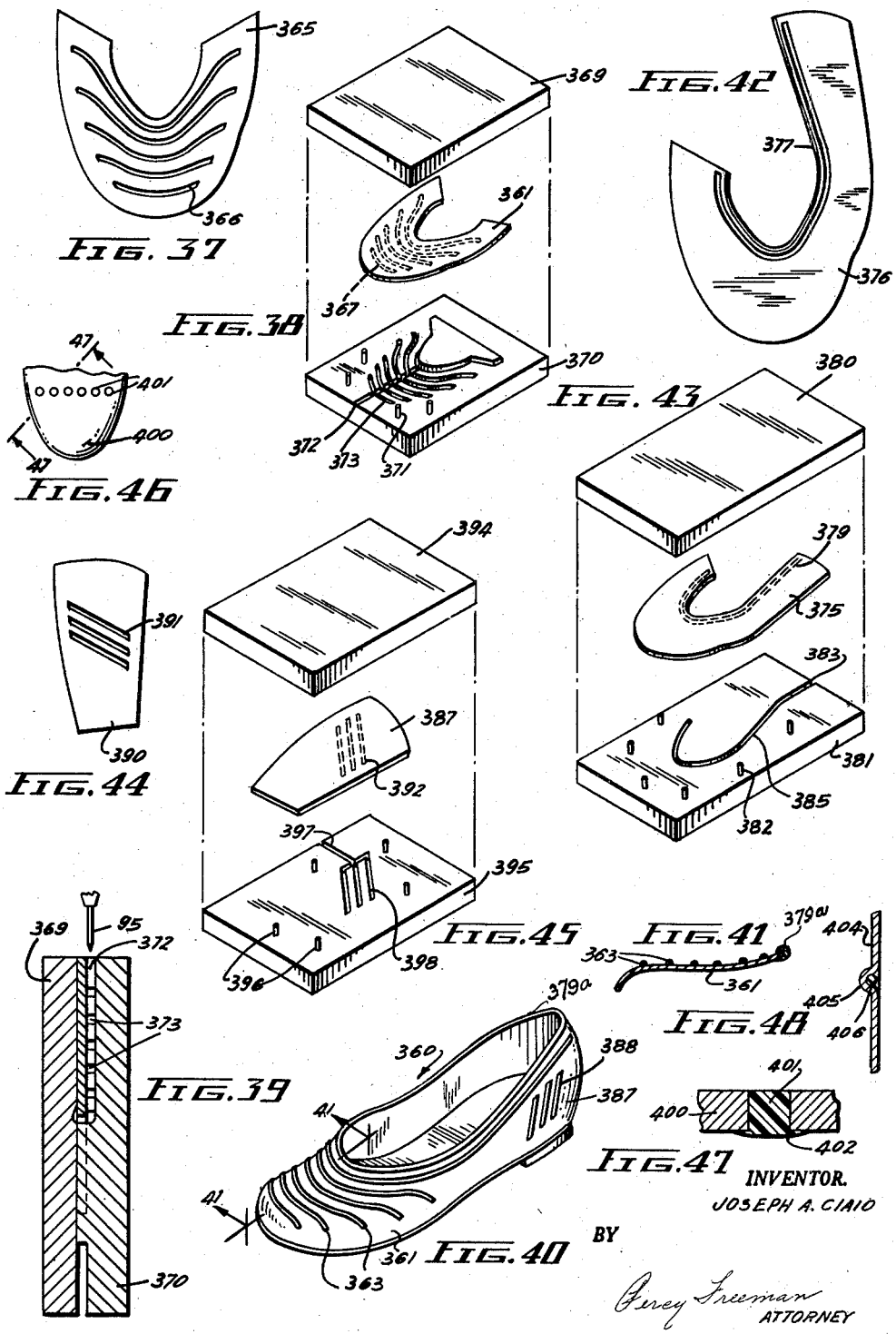

United States Patent Office 3,189,946
Patented June 22, 1965

3,189,946
APPARATUS FOR PREFORMING SHOE UPPER PARTS BY INJECTION MOLDING PRINCIPLES
Joseph A. Ciaio, Corona, N.Y., assignor to Modern Shoe Making Machine Corporation, Wilkes-Barre, Pa., a corporation of Delaware
Original application Dec. 26, 1956, Ser. No. 630,564, now Patent No. 3,026,573, dated Mar. 27, 1962. Divided and this application Mar. 26, 1962, Ser. No. 187,145
6 Claims. (Cl. 18—30)

This invention relates to shoe construction and, more particularly, to apparatus for molding contoured and profiled areas of shoes and other articles of footwear.

The present application is a division of my copending application Serial No. 630,564, filed December 26, 1956 and now Patent No. 3,026,573.

While various types of apparatus and methods have been proposed for use in connection with the shaping and forming of footwear, all have required a plurality of operations and steps in order properly to shape any desired area of the shoe upper. Aside from increasing the cost of the finished product, each additional operation also increases the possibility of error, either by the machine or the operator, thereby detracting from the quality of the end product.

An object of this invention, therefore, is to provide apparatus for fabricating various articles of footwear, that are simple in use, efficient in operation, and which will substantially reduce the number of operations required to produce a finished product.

A still further object of this invention is to provide apparatus for automatically precisely shaping and forming to size and style the quarter or counter area, toe or other portions of a shoe upper that is simple in construction, adapted to perform several distinct operations in a single cycle or operation, and which may be utilized in mass production operations.

Another object of this invention is to provide injection molding apparatus for forming and shaping articles of manufacture that is substantially automatic and which may be used to manufacture a continuous stream of finished articles.

More specifically, this invention contemplates the use of apparatus utilizing injection molding principles in the fabrication of articles of manufacture so as to produce such articles of desired shape, contour, profile, and stiffness utilizing a minimum number of operations and steps for completing such articles, and which apparatus is of simple arrangement and which may be readily adapted to mass production systems.

While the principles of this invention are applicable to substantially any and all shapes and configurations that may be encountered in the particular article to be manufactured, the principles of this invention are herein described in connection with the manufacture of articles of footwear. In accordance with this description, it will be recognized that this invention provides for the substantial reduction in the number of steps and operations required in order properly to shape and stiffen the various shoe portions, as well as to substantially reduce the possibility of error in fabricating the finished products, and otherwise simplifying the manufacture of such footwear. As is well known to those skilled in the art, it is usually required to provide a pocket in a shoe quarter and insert a counter or other similar stiffening element therein, after which the lower edges of the shoe portion are wiped and tacked to the last. With regards to the fore-part of the upper, the box-toe area and other portions must be pulled over the last before being tacked in order to obtain the desired shape. As will be hereinafter described, the present invention embodies apparatus that will avoid the necessity of separately inserting a counter, wiping, pulling the fore-part over the last and tacking the upper to the last. It will eliminate at least the following:

The dipping of a counter into an adhesive;
The insertion of said wet counter into a counter pocket;
The handling and adjustment of said counter to the proper height and position inside the counter pocket;
The separate pulling of a quarter lining;
Wrinkled linings;
Error caused by the human element;
Poor adhesion of the counter to the walls of the counter pocket or the quarter linings;
All pastes and other adhesives used to hold the counter to the quarter linings, or counter pocket;
Assembling of the upper to the last and of the centering of the back seam to the exact center of the last;
The operation of pulling over the last and incidently of the lasting machine and its operation;
The making of the box-toe;
The adhesive to hold said box-toe area in a wiped or formed position;
The operator and the bed lasting machine;
The heel seat lasting machine, tacks and operator;
Lining ironers who iron out wrinkles on the quarter linings, etc., etc.

A further object of the invention is to provide apparatus for shaping, forming and wiping the heel seat and counter areas and box toe areas of a shoe upper to produce a pre-formed upper.

In carrying out the aforementioned objects of this invention, the shoe-upper is placed in a mold to the correct back height and is held securely clamped and enclosed between male and female mold members which are exact replicas of the shoe last to be used in the lasting room operation. The shoe-upper is then injected with a plastic material which is introduced in engagement with the portion of the shoe upper to be shaped and stiffened and while the plastic material is in fluent and uncured condition; the heel seat area, counter or quarter area, thus being shaped and molded to the exact shape of the last having the heel seat wiped to the precise contour and shape of the quarter portion of the last. This upper being in its pre-formed state, having both the heel seat portion and the box toe area completed, can now be set aside and be completed at a later date, and all that remains to be done is to insert the last into the preformed upper and adhesively secure the remaining portions of the fore-part of the upper and the shank area to an insole, thereby completing the lasting room operation.

In one form of the present invention, the plastic material may be in a liquid state at the time of introduction, while in another form of the invention, it may be inserted in the form of a pre-packaged unit in combination with a catalyst or other compound capable of chemical reaction therewith to cure and set the plastic material. In either case, a predetermined quantity of material is introduced in proximity with that portion of the shoe upper to be formed, simultaneously with which the upper is molded to a desired shape. This principle of molding the respective portions of the shoe are also described in connection with the ornamentation of such footwear and methods of forming various types of pockets or areas for the reception of the plastic material. For purposes of definition, the term "plastics" or "plastic material," as used herein, is intended to include resins, thermosetting and thermoplastic, natural and synthetic rubber, and all substitutes therefor. While such thermoplastic types of material as polyethylene have been particularly satisfactory for the practice of this invention, any synthetic resin including thermosetting resins may be used since once the material is applied to the work and the material sets, there is no need to soften it. Accordingly, the synthetic resins may include fillers such as wood and glass fibers or cork granules for purposes of insulation and the like.

All of the foregoing and still further objects and advantages of this invention will become apparent from a study of the following specification, taken in connection with the accompanying drawing, wherein:

FIG. 3 is an enlarged vertical sectional view of the clamping and injection molding portions of the apparatus shown in FIG. 1, the related parts being shown in an initial operation position.

FIG. 3A is a diagrammatic view of apparatus for treating molding material for use in connection with the apparatus in FIG. 3.

FIG. 4 is a view similar to FIG. 3, showing the parts at the end of the operating cycle.

FIG. 7 is an exploded perspective view showing portions of the mold that is used to clamp the article in place for the injecting operation.

FIG. 10 is a perspective view of an inner counter-pocket lining for the counter of the shoe upper.

FIG. 11 is a perspective view of a shoe upper showing the inner lining counter-pocket attached to the outer leather by means of stitching.

FIG. 12 is a diagrammatic view of the hydraulic system used in conjunction with the apparatus shown in FIGS. 3 and 4.

FIG. 13 is a schematic circuit diagram of the electric control system for the hydraulic system shown in FIG. 12.

FIG. 14 is a fragmentary sectional view showing the mold elements in clamping engagement with a shoe upper and showing a pair of wiping elements adjacent thereto.

FIG. 15 is a plan view of the mold elements shown in FIG. 14 with the wipers in an advanced position.

FIG. 16 is a view similar to FIG. 15, showing the wiping elements in a retracted position.

FIG. 17 is an enlarged sectional view similar to that of FIG. 14, showing the wiping elements in engagement with the lower edge of the upper, and with the injection needle in a retracted position.

FIG. 18 is a perspective view of the upper following the wiping action.

FIG. 19 is a perspective view of an article of footwear formed and wiped in accordance with the present invention, with an inner and outer sole secured thereto.

FIG. 21 is a fragmentary side elevational view of the apparatus shown in FIG. 20.

FIG. 22 is an enlarged cross-sectional view taken along line 22—22 of FIG. 20.

FIG. 23 is an exploded perspective view of the apparatus shown in FIG. 22.

FIG. 24 is a perspective view, with parts broken away, of an inverted shoe-upper having a counter-pocket formed together with a fibre board material.

FIG. 25 is an enlarged cross-sectional view of that portion of the shoe upper taken along line 25—25 of FIG. 24, shown in operative engagement with a clamping mechanism.

FIG. 25A is a view similar to FIG. 25, but showing a modification wherein a cotton fleece doubler or lining is provided as a pocket to receive the plastic material.

FIG. 26 is a side elevational view of a shoe upper quarter having fore-part and quarter portions split to provide a self-contained counter-pocket and box toe pocket.

FIG. 27 is a top plan view of the portion shown in FIG. 26.

FIG. 31 is a side view of a container of plastic material suitable for insertion within a counter-pocket adapted to be molded therein.

FIG. 32 is a cross-sectional view taken along line 32—32 of FIG. 31.

FIG. 33 is a sectional view showing the container shown in FIGS. 31 and 32 inserted between the outer leather and inner lining of a shoe upper.

FIG. 34 is a side view of another container in which a plastic material is contained in two separate pockets, the wall between them being frangible to intermingle the plastic material in the two pockets.

FIG. 35 is a view similar to FIG. 34, showing a still further type of container adapted to be inserted within a counterpocket.

FIG. 36 is a cross-sectional view taken along line 36—36 of FIG. 35.

FIG. 37 is a plan view of a stencil in which a sheet of leather may be sand-blasted to roughen a design area prior to applying a three-dimensional plastic ornamentation thereto in accordance with this invention.

FIG. 38 is an exploded perspective view showing the mold parts and a sheet of leather between them being sand-blasted through the stencil shown in FIG. 37, prior to molding the plastic ornamentation thereon.

FIG. 39 is a sectional view showing the mold parts and a piece of leather between them clamped in place and ready for the plastic injecting operation to ornament the sand-blasted leather shown in FIG. 38.

FIG. 40 is a perspective view of a completed shoe ornamented in accordance with the present invention.

FIG. 41 is a cross-sectional view taken along line 41—41 of FIG. 40.

FIG. 42 is a plan view of another stencil by which a section may be sand-blasted to produce the ornamental bead parallel to the top edge as shown in FIG. 40.

FIG. 43 is a view similar to FIG. 38, showing the section of leather being sand-blasted to simulate the French Cord Binding shown in FIGS. 40 and 41.

FIG. 44 is a plan view of still another stencil through which a section of leather may be sand-blasted to produce ornamentation in accordance with the present invention.

FIG. 45 is a view similar to FIG. 43, showing the design of the stencil shown in FIG. 44 being sand-blasted onto a section of leather.

FIG. 46 is a fragmentary plan view showing a plurality of dots formed on a vamp of shoe upper in accordance with this invention.

FIG. 47 is an enlarged cross-sectional view taken along line 47—47 of FIG. 46.

FIG. 48 is a fragmentary sectional view through an upper showing a hollow or embossed rib formed in a shoe upper for ornamentation, containing an inner core of plastic material deposited therein in accordance with the present invention.

FIG. 49 is a perspective view of an independent preformed counter of leather or other material, between the plies of which plastic has been injected in accordance with the present invention.

Figure 1:
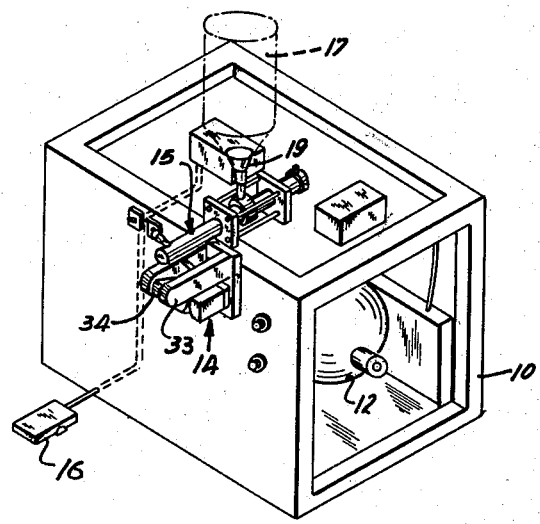
FIG. 1 is a perspective view of a machine made in accordance with the present invention.
Figure 2:
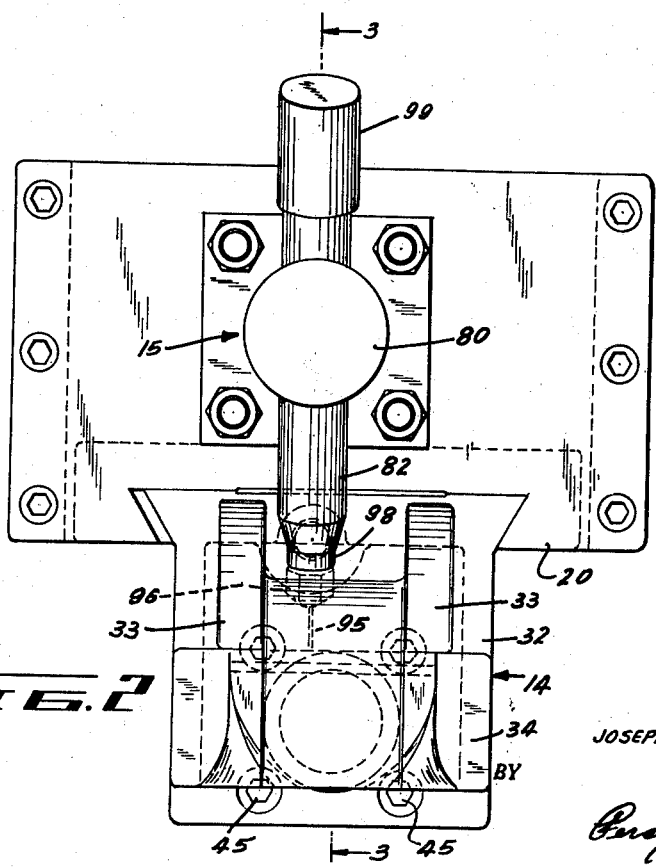
FIG. 2 is an enlarged top plan view of portions of the apparatus shown in FIG. 1.
Figure 5:
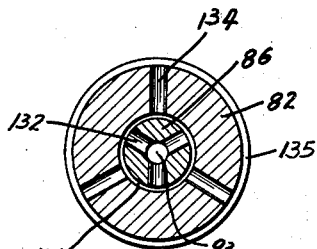
FIG. 5 is an enlarged cross-sectional view taken along line 5—5 of FIG. 3.
Figure 6:
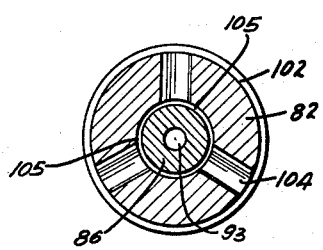
FIG. 6 is an enlarged sectional view taken along line 6—6 of FIG. 3.
Figure 8:
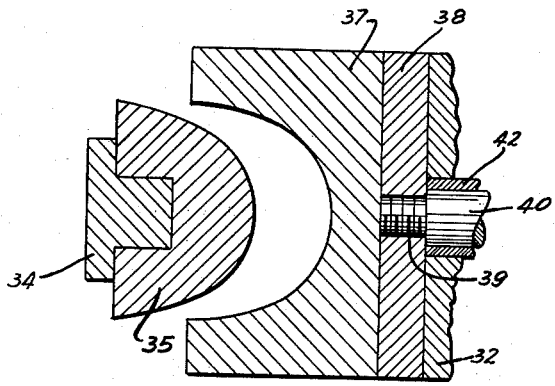
FIG. 8 is an enlarged fragmentary sectional view taken along line 8—8 of FIG. 3.
Figure 9:
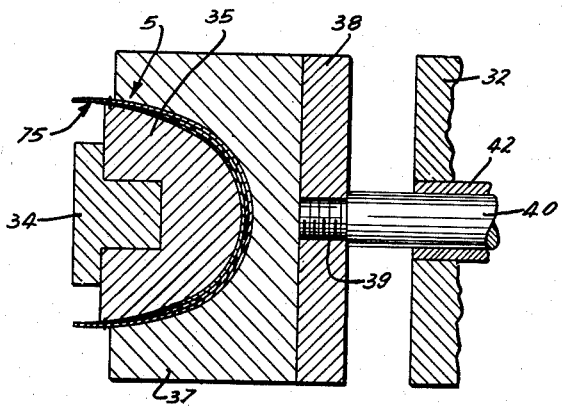
FIG. 9 is a view similar to FIG. 8, but showing the parts in a clamping position with a portion of a shoe in place therein.
Figure 20:
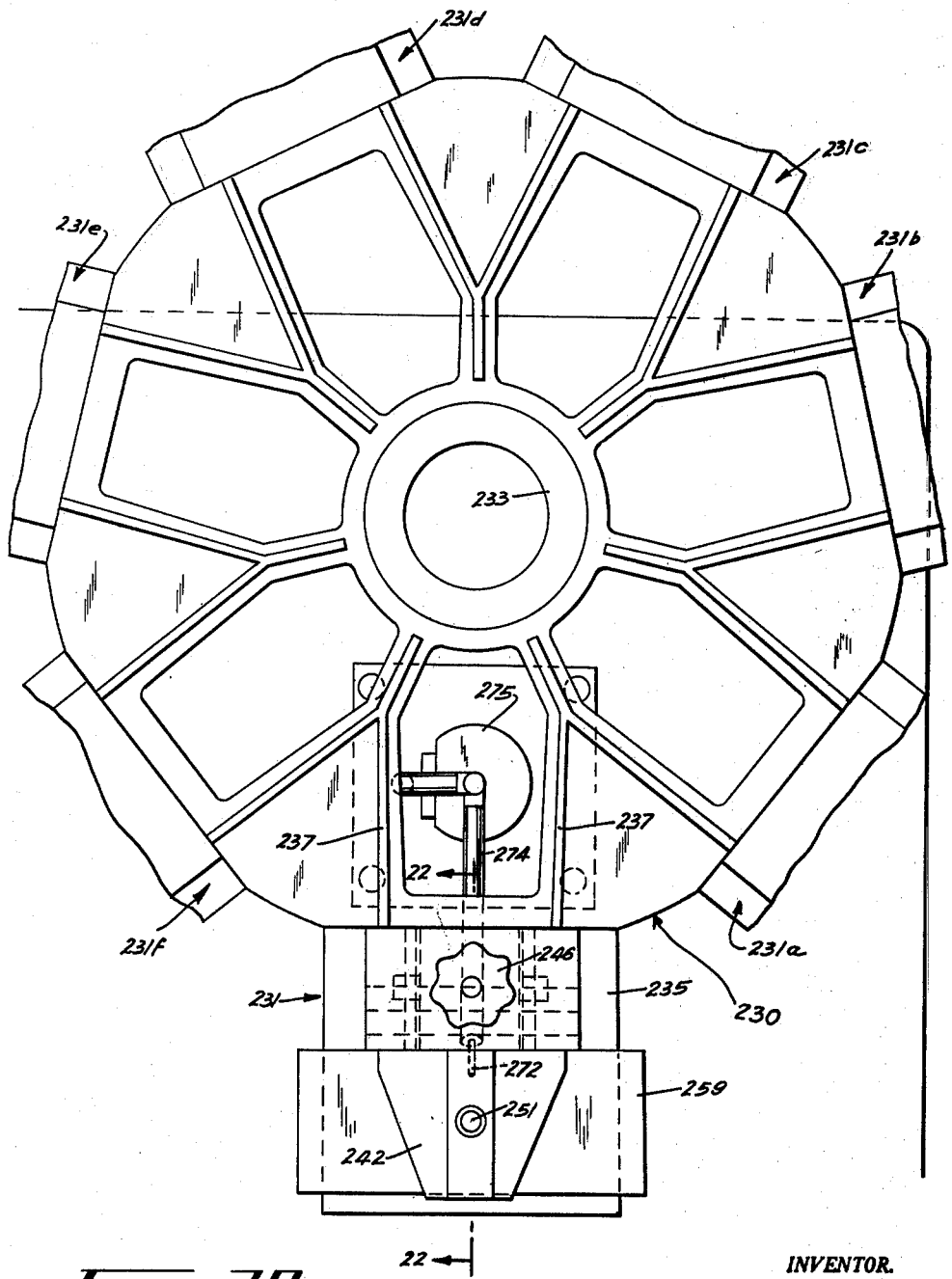
FIG. 20 is a fragmentary plan view of an automatic turret mechanism having injection molding and clamping means made in accordance with this invention carried thereby.

Referring now to the drawing, it will become apparent that the basic portions of the apparatus include the mechanism for clamping and injection molding the portions to be formed or stiffened. This apparatus also includes means for wiping or forming the molded portions of the shoe uppers, as well as turret means for supporting a plurality of clamping devices for sequential injection molding of a plurality of portions for mass production purposes. While there are various proposed methods of forming the particular pockets or surfaces to be stiffened or treated, the injection molding principles of this invention may be applied thereto, as well as the use of various types of prepared plastic packets for use therewith. Whether the injection type of molding or the plastic packet insertion type of molding is used, the same basic clamping and wiping mechanism may be employed. Similarly, the clamping mechanism herein described may be used in connection with the ornamentation of the respective surface portions as well as the forming and stiffening thereof, as will be hereinafter described.

Clamping apparatus

Referring now to FIGS. 1 to 13, the basic clamping and injection holding apparatus made in accordance with this invention is shown to include a housing 10 which supports a suitable motor 12 and the assembled clamping device 14 and injection molding equipment 15 thereon. As shown in FIG. 1, a foot switch 16 is disposed adjacent to the housing for actuation by the operator to effect the start of a clamping and/or molding cycle. A quantity of plastic material such as polyethylene, may be stored within a hopper 17 which has a delivery tube 19 that is adapted to supply the molding apparatus with the material as required.

As is more clearly shown in FIGS. 3 and 4, the clamping apparatus 14 is shown to include a rigid base 20 that is secured to the housing 10. The base 20 slidably and adjustably supports the bracket 22 and is longitudinally adjusted relative to the base by means of a threaded bolt 23. This bolt threadingly engages the threaded bore 24 in a boss 25 carried by the bracket, and is in rotatable supported engagement with an opening 26 in a depending flange 27 of the base 20. A pulley 29 secured to the head of the bolt 23 is adapted to be driven from a remote point to automatically adjust the longitudinal position of the clamping device relaitve to the injecting apparatus 15, so as to properly position the respective parts. A spring 30 disposed around the bolt 23 normally urges the bracket towards an extended position, so as to adjust the position thereof in response to corresponding movement of the adjustable pulley 29. The bracket 22 also includes an enlarged base plate 32 having a pair of spaced arms 33 that are connected at their outer extremity by a transverse base portion 34. The base 34 rigidly supports one part 35 of a two part mold, the other part 37 thereof being rigidly secured to a base 38 that is carried by the threaded stud 39 of a reciprocating plunger 40. The plunger 40 extends through a bushing 42 carried in a bore 43 in the base plate 32.

Secured to the backside of the face plate 32 is the front end 44 of a pressure cylinder that is connected thereto by means of longitudinally extending bolts 45. These bolts also secure the rear end 47 of the cylinder to the face plate. Each of the cylinder ends are provided with inwardly facing shoulders 48, 49, respectively, that extend into the pressure cylinder 50 in supporting relationship thereto. The piston 51 that is carried by the plunger 40 is adopted to travel longitudinally between the limits defined by the respective shoulders 48, 49. An inlet port 53 associated with the rear end 47 of the cylinder is adapted to supply a pressure fluid thereto to urge the piston 51 forwardly to abut with the front shoulder 48; an inlet port 54 is associated with the front end 44 of the cylinder and is adapted to supply a pressure fluid to the cylinder to retract the piston into engagement wtih the rear shoulder 49.

Each of the respective ends of the cylinder is provided with enlarged bores 55, 56, to permit the communication between the inlet ports 54, 53, respectively, and the interior of the cylinder 50. O ring seals 58 are provided between each of the relatively movable parts so as to maintain a sealed, fluid pressure, relationship. While the inward and outward movements of the piston 51 are limited to its abutment with the respective shoulders 48, 49, this movement is still further controlled by a threaded stop control collar 60 that is threadingly engaged with a threaded boss 61 of the rear end 47 of the cylinder 50. This collar 60 also has a pulley portion 62 that is adapted to be remotely controlled or rotated so as to adjust its longitudinal position relative to the cylinder 50. This adjustment determines the extent of inward movement of the piston 51 in response to the abutment of the shoulder 64 on the forward end of the stop member 65 that is secured to the end of the plunger 66 by means of a nut 67. The stop member 65 is also provided with a two-stage cam surface 69 that is engaged by a follower roller 71 carried by the actuating arm of a switch 72 of the electric control circuit of the mechanism, for purposes hereinafter described.

The aforementioned mold clamping structure is used to rigidly secure and position the desired portions of a shoe upper 75 between the male and female members 35, 37, in order to mold or to otherwise cause a plastic substance inserted therein to be fixed or set in a predetermined shape. The interior portions of the mold members are provided with a resilient seal 76 that insures a tight fit and prevents leakage of any of the plastic material. This seal may be provided on either the male or female portion of the mold or both. In order to prevent injury to the fingers of the operator, the closed movement of the mold members is controlled by two Borden-type of pressure responsive switches 77, 78 (FIG. 13), that provide for a two-stage closing of the mold members. The low pressure switch 77 is adapted to open the electrical circuit in the event that resistance of greater than 200 pounds is met by the inward thrust of the plunger 40, until the follower 71 rides up the inclined surface 69 of the cam carried by the stop member 65 (see FIG. 12). This movement of the follower is thus active to effectively cut out the low pressure switch 77, whereupon the remainder of the clamping movement of the plunger 40 is controlled by the high pressure switch 78, whereupon a maximum force of 1,000 pounds may be maintained between the mold members 35, 37, under the control of the high pressure switch 78. It will be recognized, therefore, that in the event the operator's fingers are placed between the mold members during the initial forward movement of the plunger 40, the resistance to this forward movement is operative to cause the siwtch 77 to deenergize the system before severe injury occurs.

Injection molding apparatus

An injection molding head 80 is also carried by the base 20 and has an inclined bore 81 which supports a tubular housing 82 extending therethrough and secured in position therein by a set screw 83. Within a longitudinally extending bore 85 of the housing 82, a retractable spindle 86 is supported for reciprocating movement between two predetermined limits. A compression spring 87, seated at one end on a shoulder 89 at the upper end of the housing 82, is in abutment at the other end with a sleeve 90 secured to the upper end of the spindle 86 by means of a nut 91, normally urging the spindle 86 in an upward direction. The upward movement of the spindle is limited by a shoulder 92 at the lower extremity thereof that is adapted to abut with the lower end of the housing 82. A centrally disposed longitudinal bore 93 in the spindle is adapted to supply a hypodermic-type of needle 95 with the plastic molding material. This needle 95 is carried by a threaded cap 96 that is in threaded engagement at the lower end of the spindle 86. The upper end of the housing 82 is closed by a threaded cap 99.

A supply of molding material is adapted to be delivered to the bore 93 in the spindle from the lower longitudinally extending bore 101 in the molding head 80. This bore communicates with the lower annular recess 102 in the housing 82 which is immediately adjacent to radially extending transverse bores 104 that communicate with an annular recess 105 disposed around the mid-portion of the spindle 86. The molding head 80 has a multiple bore conduit 106 that extends into a tubular base 111. The inner end of the conduit has a reduced portion 107 that is encompassed by a sleeve 108 and which has a flared opening communicating with the longitudinal bore 101. This sleeve 108 is adapted to be slidably received within the internal bore 109 of a tubular slide rod 110 that is mounted for reciprocating movement within the tubular base 111.

A pressure fluid supply housing 112 is disposed in the molding system for supplying pressure fluid to various parts of the device. The forward end of this housing is provided with a shoulder 113 that defines one limit of the longitudinal movement of the head 115 of the slide 110. An abutment 116 disposed adjacent to the other end of the base 111 defines the other limit of this movement. Secured to the opposite side of the pressure fluid supply housing 112, is a tubular cylinder 118 having an internal bore 119 within which the head 120 of a longitudinal ram 121 is supported for reciprocating longitudinal movement. The inner end of the ram is provided with high pressure packing 122 that is secured thereto by means of a nut 123. The pressure fluid supply housing 112 has an inlet port 125 that is adapted to deliver pressure fluid to the interior of the tubular base 111 to move the slide 110 into enclosing engagement with the sleeve 108 carried by the reduced portion 107 of the conduit 106. In response to this movement, any molding material contained within the loading chamber 126 disposed beneath the supply hopper 17, is automatically confined within the forward end of the bore 109 of the tubular slide. Therefore, when a pressure fluid is supplied to the inlet port 127 of the cylinder head 128, the ram 121 is urged into pressure engagement with the molding material contained within the slide rod 110, thereby forcing it through the lower longitudinal bore 101 of the molding head 80. The material flowing through the bore 101 passes through the transverse bores 104 of the housing into engagement with the annular recess 105 of the spindle, whereupon the spindle is urged outwardly of the housing in a piston-like manner. Upon reaching the extended position defined by the abutment of the sleeve 90 with the upper end of the housing 82, the upper annular recess 131 of the spindle, together with the transverse bores 132 therein are automatically brought into registry with the supply bore 101, so that the molding material is supplied directly to the feed bore 93 of the spindle. When so supplied, the parts will have assumed the position shown in FIG. 4, whereupon molding material is injected directly to the portion clamped by the aforementioned mold members. As soon as the measured amount of material is injected into the clamped portion, as determined by the amount of material within the charging chamber 126, or in response to the build-up of a predetermined amount of pressure, the forward action of the ram 121 is stopped.

A pressure fluid is then supplied to the inlet port 140 disposed in the tubular base 111, which pressure fluid is operative to cause the tubular slide 110 to retract to its original position against the abutment shoulder 113. In moving to this position, a partial vacuum is created within the closing chamber 126 and the upper bore 137 in the molding head, so that excess molding material contained in the bore 93 is removed therethrough as the spindle 86 is returned to its normal position.

In the normal position, the upper annular recess 131 in communication with the transverse bores 132 are in registry with the upper bores 134 of the housing which communicate with the upper bore 137 of the molding head. The ram 121 is also retracted to its original position by means of a pressure fluid being supplied through the inlet 142 of the pressure fluid supply housing 112. In order to provide a pressure tight seal between the respective elements, gaskets 144 are provided between the relatively movable parts.

Referring now to FIG. 3a (Sheet 7), auxiliary apparatus is shown that may be used in conjunction with the molding material supply system described in connection with FIGS. 1 to 4. This apparatus includes a fluid plastic supply line 150 that has a bore in communication with a cylindrical bore 152 within a rigid housing 153. A supply hopper 154 communicates with one end of this housing 153, the other end of which is confined within a plurality of heating bands 155 that may be electrically energized to heat that end of the housing. The adjacent end of the housing is closed by a threaded end plug 157 having a bore 158 in communication with the bore of the supply line 150. This plug 157 also includes a pair of integral legs 161 that are adapted to rigidly support a torpedo-shaped element within the cylindrical bore 152 of the housing. This torpedo element urges the material drawn through the housing against the inside surfaces of the housing that are heated by the heating elements 155, thereby assuring an even melting thereof as the material is forced towards that end by a reciprocating ram 162. In order to prevent the premature melting of the material supplied, the opposite end of the housing 153 is provided with an encompassing water jacket 163 having a supply line 164 for delivering cold water thereto. The cold water maintains the material at that end of the housing in a solid state and does not permit the material to melt until it is rammed into engagement with the heated sides of the housing.

Referring now to FIGS. 12 and 13 of the drawing, the sequential control of the clamping and injecting apparatus may be more clearly followed. The supply of pressure fluid to the respective ports is controlled by a four-way control valve 175 that supplies pressure fluid through two supply lines 174, 177, which communicate with each of the actuating sides of the respective rams and with a branch line 172 that supplies a pressure fluid to the sequence control valve 170. The four-way control valve 175 governs the supply of pressure fluid to the retracting sides of the respective rams and plungers, so that pressure fluid is supplied to the supply branches 176, 177, only in response to the opening of the four-way control valve 175. A supply of pressure fluid from the sequence control valve 170 to the ram actuating ports, is operative to urge the respective rams of the clamping and injecting molding devices towards their actuated positions; a supply of fluid from the four-way control valve 175 to the retracting ports of the respective rams and plungers is operative to return these elements to their normal position. The particular sequence of operation is controlled by an electrical system that is initially actuated by the foot pedal 16 which closes the foot pedal switch 180. Each of the low and high pressure safety switches 77, 78, are in an initially closed position so that the closing of the foot pedal switch 180 is adapted to energize the relay 182 which, in turn, energizes the solenoid 184 to effect initiation of the four-way control valve 175. In the event that an excess pressure is created during the initial closing of the clamping mold, such as resistance caused by the presence of the operator's fingers between the die portions thereof, the safety switch 77 is opened, thereby automatically deenergizing the system. In the event that this switch is not opened, the aforementioned sequential operation of the device is automatically initiated.

Referring now to FIGS. 10, 11 and 19, one form of shoe upper construction is shown that may be used in conjunction with the present invention. This upper 75 includes an outer leather quarter 186 having an inner counter pocket lining 187 secured to the interior thereof, such as by stitching 188, around part of the periphery thereof. Similarly, the upper 75 includes a forepart 190 that has a box toe area pocket lining 191 secured to the inner surface thereof, such as by stitching 192, which also includes an inlet 193 that is adapted to receive the needle 95 of the injecting molding apparatus to supply a quantity of the plastic thereto. In carrying out the methods proposed by this invention and in using the apparatus heretofore described, the work, which may be in the form of a shoe upper 75, is placed in association with the clamping apparatus so that the sides "S" of the portion of the shoe being worked, define a pocket "P" that is in position to receive the injection needle 95. The parts are thus clamped and molded with the molding material inserted within the pocket, after which the treated portion thereof may be "wiped," in a manner hereinafter described, following which, the inner sole 194 and outer sole 195 may be applied thereto to produce a substantially finished shoe as shown in FIG. 19.

*Wiping apparatus*

Referring now to FIGS. 14 to 18, wiping apparatus in accordance with the present invention is shown that may be used in connection with the clamping and injecting molding apparatus hereinbefore described. This apparatus 200 includes a base plate 201 that is secured to the threaded stud 39 of the plunger 40 of the clamping mechanism. The upper portion of the base plate 201 has an upwardly extending flange 203 disposed in association with a circuit bearing 205 that is adapted to support a reciprocating plunger 207 for longitudinal movement parallel to the movement of the clamping plunger 40. The wiping plunger 207 is secured to a flange 208 of a bifurcated plate 210 that has a pair of parallel side surfaces 211, 212, that terminate in inwardly converging side surfaces 214, 215, respectively. The bifurcated plate 210 is adapted to be moved between two extreme longitudinal positions, which movement is adapted to actuate a pair of wiper arms 217, 218, associated therewith. These wipers 217, 218, are yieldably secured together at their adjacent ends by means of a junction spring 219 and are yieldably secured at their mid-portions to the bifurcated plate by means of tension springs 221, 222, respectively. Extended movement of the wiping plunger 207 to the left, as viewed in the drawing, is adapted to effect the rotation of the wipers 217, 218, from a normally open position as shown in FIG. 16, to a displaced position overlying the pocket defining portions S of the shoe upper 75, as shown in FIG. 15. The apparatus is so arranged that the wiping mechanism is actuated immediately following the withdrawal of the injection needle 95 from the pocket of the workpiece, so that the wiping elements are adapted to move the desired portions to a predetermined position before the plastic material sets. In moving from the normal to the displaced position, the wiping elements are adapted to turn down or "wipe" the lower extremities or lasting allowance 227 of the counter-pocket of the particular shoe upper 225, as shown in FIG. 18. Following this operation, the upper is immediately ready for the application of the inner sole without having to first tack the upper to the last and wipe the respective portions. Furthermore, since the plastic material within the pocket also extends into the lower extremities 227 thereof, this portion of the shoe upper is also maintained in a desired shape so as to add additional body and stiffness thereto.

*Turret Assembly*

While the aforementioned apparatus has been described in connection with the production of single units, it is also possible to apply this apparatus to mass production methods, so as to produce a continuous supply of finished products. Referring to FIGS. 20 to 23 (Sheets 8, 9 and 10), apparatus for mass producing such pre-formed articles is shown in the form of a turret 230 that is adapted to rotate in a vertical plane and which includes a desired number of loading stations 231 that are adapted to receive a workpiece therein. The turret is rotated by means of a horizontally disposed spindle 233 that is drivingly engaged within the housing 235. Each of the turret stations 231 are provided with a pair of support arms 237 which support a bracket 238 of the clamping and molding mechanism. As more clearly shown in FIG. 23, the bracket 238 has a pair of parallel grooved side arms 239, 240, which slidably receive the base 242 of the molding structure. The base 242 is maintained in engagement with the support arms 239, 240, by means of a stop member 244 that locks in associated slots 243 at the outer end of the support arms 239, 240, and which is secured to the base 242 by means of a threaded bolt 245 having a handle 246. The base member 242 carries the male mold member 250 of the mold structure which is secured thereto by means of a bolt 231. The female mold member 253 is secured to a secondary support bracket 254 that is threadingly engaged with the outer end of a plunger 255 having an enlarged head 257. In view of the aforementioned threaded and slotted connections, it becomes a simple operation to change the male and female mold members for any particular operation or type or size of finished product to be produced.

While each station of the turret includes the forementioned clamping apparatus, the construction is provided with but a single actuating mechanism and injection molding equipment. As each station is sequentially rotated into association with the actuating mechanism, a clamping piston 262 which may be energized in accordance with the aforementioned hydraulic and electrical systems, is extended into engagement with the enlarged head 257 of the plunger 255 which supports the female mold member. The head 257 of the plunger extends through an enlarged bore 260 in the back plate 259 of the bracket 238. During this movement, the sides S of the article of manufacture are moved into the predetermined position of the mold members to form a pocket P therebetween for the reception of the molding material. After the fluid molding material has been injected into the pocket, a second actuating ram 267 is adapted to engage with the plunger 269 that is carried by the bracket 238 to actuate the wiping blade 270 to wipe the adjacent portions of the article in the manner hereinbefore described. Following the wiping operation, a retractable plunger 264 that engages with a correspondingly shaped opening 265 in the back plate 259 is retracted in order to permit the turret to be rotated so as to bring the next station into engagement with the various actuating members, the plunger 264 being returned to engagement with the opening 265 of the station thus positioned. The plastic molding material may be prepared in the manner hereinbefore described, after which it may be supplied to the injection needle 272 through a flexible supply line 274 which leads from the source 275 of the pressurized plastic material and which may be pivoted out of the way of the parts as the turret is rotated or indexed to the next station.

Referring to FIG. 21, it will become evident that as the turret 230 is rotated so as to sequentially bring one station after another into association with the respective actuating, wiping, and injecting molding equipment, a stop member 277 maintains the turret in a vertical position against the thrust of the respective piston and plunger members. While the flexible supply line 274 for delivering the molding material to the formed pockets is shown arranged for manual operation, it will be recognized that each of the clamping, injection molding, wiping, and positioning operations may be automatically controlled in accordance with the aforementioned hydraulic and electrical control systems. Similarly, the particular number of stations provided in any one turret assembly may be varied depending upon the amount of time required for the plastic material to set or depending upon the type of product to be manufactured. In the manufacture of footwear, it has been found quite satisfactory to provide seven stations on the turret so that as one station is being treated, five other stations may be idling so that the plastic material inserted therein may set, and one station is left to be unloaded and loaded during the treatment of the first-mentioned station. This arrangement provides a substantially continuous process in that the time required to remove a treated article and insert an untreated article is substantially identical to the amount of time required to treat the previously inserted article; the other articles being permitted to set until that particular station is rotated to the discharge position. It will be recognized that by properly arranging the molds, the turret can be used to accommodate three pairs of the shoes of the same or different sizes. Of course, this greatly simplifies the system of manufacture.

*Forming the plastic receiving pockets*

Referring now to FIGS. 24 to 30, various types of pockets and methods of forming such are shown, all of which are adapted to receive a plastic type material therein in accordance with this invention. A simple method of forming a counter-pocket is also shown in FIGS. 10 and 11, as hereinbefore described, wherein a counter-pocket lining 187 is secured to the inside surface of the shoe upper by means of stitching 188 so that a space between the lining and outer leather is adapted to receive a plastic material therein. In FIG. 11 there is also shown a box toe area pocket wherein a lining 191 is secured to the toe area by means of stitching 192 so that the space between the lining and the outer leather is adapted to receive a plastic material therein for forming a toe box. As shown in FIGS. 24 and 25, a shoe upper 300 is shown to include an outer leather quarter 301 that has a counter-pocket lining 303 secured to the interior thereof, such as by stitching 304. A strip of material such as fiberboard 306 is disposed between the outer leather 301 and counter-pocket lining 303 adjacent to the lower edges thereof and tapers inwardly towards the center of the pocket so as to terminate in a very thin edge 307. As shown in FIG. 25, the fluid plastic material 309 that is injected into the interior of the counter-pocket by the needle 95, in accordance with the injection molding priciples hereinbefore described, is caused to completely fill the interior of the pocket, but in various degrees of thickness. Because of the tapered construction of the fiberboard insert, the plastic is caused to flow to a pair of very thin edges toward the top, and a very thin edge toward the bottom of the pocket so that various degrees of stiffness are provided. Of course, the fiberboard is formed together with the adjacent portions of the upper and the plastic material during the heel seat wiping operation so that the fiberboard provides an integral bond between the shoe upper and the wiper portion thereof that is connected to the innersole.

Figure 28:
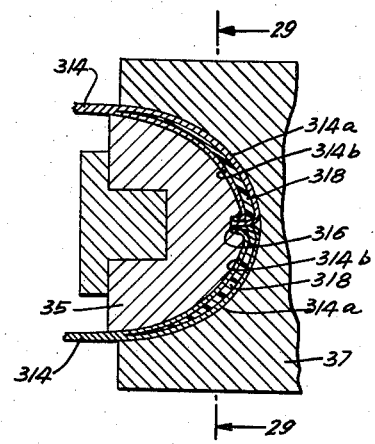
FIG. 28 is a cross-sectional view of a shoe upper showing the quarter portions of the type shown in FIG. 26, sewed together and in operative engagement within the clamping elements of the molding apparatus.
Figure 29:
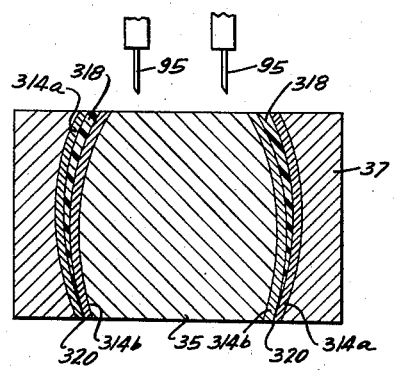
FIG. 29 is a cross-sectional view taken along line 29—29 of FIG. 28, showing the double injection needle for forming the split leather quarter.

Referring now to FIGS. 26 and 27, one-half 312 of a shoe upper is shown having a fore-part, that is, the box toe area 313 and a quarter 314, each of which is split into two parts, 313a, 313b, and 314a, 314b, respectively, so that pockets for the reception of plastic molding material are automatically formed when the two halves 312 of the upper are secured together, such as by stitching 316. As shown in FIGS. 28 and 29, a counter-pocket is formed in each side of the upper without requiring the application of a separate counter-pocket lining. The inner portion 314b of the quarter forms the lining which, together with the outer leather 314a, forms a separate pocket for the reception of the plastic material 318. In molding this particular upper, the upper is positioned in the male and female molds 35, 37, in a manner hereinbefore described. However, in applying the plastic material to the interiors of the separate pockets in accordance with the injection molding principles described, two such needles 95 (FIG. 29), are used instead of the single needle disclosed. The needles may be so mounted on the molding equipment so as to be supplied from the single source, part of the plastic passing through each of the needles into the formed pockets. Because of the shape of the mold dies, the material is caused to completely fill the interior of the pockets and taper towards a feather edge 320 adjacent to the top line of the shoe upper.

Figure 30:
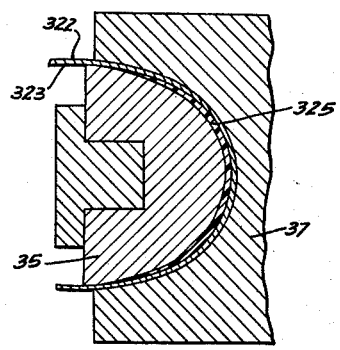
FIG. 30 is a view similar to FIG. 28, showing a quarter being formed and stiffened by the adhesion of plastic to the interior or skin surface of a leather quarter.

A still further form of quarter construction is shown in FIG. 30, wherein a shoe upper 322 is provided with a plastic counter in the absence of any counter-pocket lining at all. In this construction, the outer leather is clamped within the mold in the manner described, after which the plastic is inserted between the flesh side 323 of the upper and the male member 35 of the mold. Due to the fact that the mold members are highly polished, the plastic will not adhere to the mold so that upon the proper setting of the plastic, the shoe upper may be removed from the mold with the plastic counter material 325 secured to the upper merely by its own adhesion thereto.

A modified construction is shown in FIG. 24A wherein two layers or plies of fleece cotton doubler material are cut to the form and shape of a counter, one layer or piece 326 of the doubler being secured to the layer or ply 326a about one quarter of an inch from the top line of the upper 327a by a line of stitching 328. The upper peripheral edge of layer 326a is then secured as by stitching 329 to the upper at the folded edge of the top line or it can be secured with and at the time of the French cording operation of the top line, thus creating a pocket within a pocket and then injecting the fluid plastic between the two plies of fleece cotton doubler, or any other suitable material to be used in the same manner. When this pocket within a pocket is injected with plastic, the flow of plastic material will thereby be limited up to stitched line 328 so only the one-quarter inch at the top line will remain soft and pliable and will be free to follow the bone structure of the different types of individual feet.

In FIG. 49 there is shown a pre-formed independent counter 425 made up of two plies 426 of leather, fibre or other suitable material. These plies may be secured together in any well known manner or they may be united by the adhesion of the plastic 427 which is injected between the plies while they are between male and female mold members previously described. This counter may be completely shaped and may include the wiped over heel seat area 428.

*Plastic packet inserts*

While the various types of article construction and clamping and wiping apparatus have been described in connection with the injection molding principles herein set forth, substantially identical results may be obtained by using packet inserts in place of the injection molding thereof. In this arrangement, the plastic packet is simply introduced into the article of manufacture by placing it in proper position prior to the clamping and molding thereof, thereby eliminating the necessity of providing the injection molding equipment. Since the same clamping and molding sections and wiping apparatus may be used in this arrangement, the methods of preparing the article of manufacture for this operation are also substantially identical. As shown in FIGS. 31 to 36, the plastic is properly positioned with the desired portions in the form of a self-contained packet that is constructed of suitable size and configuration.

Referring to FIGS. 31 to 33, one form of such packet 330 is shown to be constructed of a rupturable flexible sheet material 331 that is sealed along peripheral edges to define a centrally located pocket that is adapted to receive the desired plastic material 333. The outer peripheral edges of the packet are in the form of tabs 332 which provide a means for anchoring the packet in proper position between the lining 335 and outer leather 336, such as by stitching 337. Since these packets or capsules can store various plastics as long as necessary before use, the ordinary steps are followed in the construction of the shoe up to the point where the shoe ordinarily would be assembled to the last. At this point, the portion of the shoe upper containing the packet is placed between the mold members, whereby the packet is ruptured and the plastic material distributed completely throughout the confined counter-pocket area, fully conforming to the particular mold shape. The use of such packets can be applied to the manufacture of any or all parts of the shoe such as box toes, counter areas, shank areas, etc.

A modified form of packet construction is shown in FIG. 34, wherein the packet 340 is provided with a centrally located pocket that is divided into two sections by a membrane 342 that may be constructed of a material similar to that used in the construction of the packet, such as the plastic sheeting 341. One section 343 of the packet is adapted to contain the plastic forming material, while the other section 344 is arranged to contain a suitable catalyst for the plastic. This packet is also provided with tabs 345 for securing the packet to the desired portion of the article to be manufactured. When the desired part of the article is placed in the mold and a pressure exerted thereon, the sheet material 341, together with the partition 342 will rupture so as to permit the proper mixure of the materials and the complete distribution thereof in the desired pocket area.

Referring now to FIGS. 35 and 36, a still further form of plastic packet assembly is shown having a rupturable central area formed of sheet material 351 that is divided into four separate sections by means of a similar rupturable membrane 353. Each of these sections 355a, b, c, d, may be used to store a desired plastic material 357 or catalyst 358 apart from each other until combined in response to the application of pressure to the packet sufficient to rupture the dividing membranes. Suitable tabs 359 extend outwardly along the peripheral edges of the packet and are adapted to be secured to the article of manufacture in the desired area thereof, after which, the area is molded in a manner hereinbefore described.

*Ornamentation*

Referring now to FIGS. 37 through 48, various types of ornamentation are shown applied to certain parts of a shoe. As more clearly shown in FIG. 40, a shoe 360 ornamented in accordance with the present invention includes a fore-part 361 that has a plurality of ribs 363 extending transversely thereof. In preparing the leather surface for this ornamentation, a stencil 365, as shown in FIG. 37, having a plurality of transversely extending openings 366 is used to sand-blast the design 367 onto the fore-part. The sand-blasting through the stencil roughens the exposed portions of the leather so that a suitable plastic material will readily adhere thereto when applied during the course of a molding operation. As shown in FIGS. 38 and 39, the sand-blasted fore-part 361 is placed between mating mold members 369, 370, of a molding device, which may be associated with the molding apparatus hereinbefore described, one of the mold members 369 being arranged to be supported upon the base 34 and the other mold member 370 being arranged to be supported upon the base plate 201 of the mechanism. The mold members are provided with positioning pins 371 and a sprue 372 that delivers plastic material to the channels 373 which define the design, from the injection needle 95 of the molding apparatus. With the mold parts clamped together, a predetermined quantity of plastic material is injected into the mold cavity, the material adhering to the sand-blasted design 367, but not adhering to the other portions of the material. Accordingly, when the part is removed from the mold, all of the plastic material may be removed therefrom except the material that has engaged with the roughened designed surface.

Other designs may also be obtained in accordance with the foregoing procedure. In FIGS. 42 and 43, the fore-part 375 of a shoe upper is shown being treated for the application of a French cord binding. The stencil 376 is provided with a continuous slot 377 running substantially the entire length of the inside edge. This slot is arranged to cause the roughening of a similar area 379 on the top surface of the fore-part 375 when submitted to a sand-blasting operation. Accordingly, when the part 375 is placed between the mold members 380, 381 with the sand-blasted design in registry with the similarly shaped channel 385, plastic material supplied to the interior of the mold through the sprue 383 is caused to be securely adhered to the roughened surface. The positioning pins 382 assure the proper alignment of the mold parts so that the plastic is properly directed to the sand-blasted area of the part, any excess material deposited upon the other portions of the part being readily removable from the polished surface. In the same manner, a simulated French Cord binding 379a (FIGS. 40–41) may be applied.

In FIGS. 40, 44 and 45, a shoe quarter 387 is shown provided with a plurality of spaced ribs 388 that have been applied thereto in accordance with the foregoing procedure. A stencil 390, provided with similarly arranged openings 391, is used to sand-blast a similar design 392 on the outer surface of the quarter, after which, the quarter is placed between the mold parts 394, 395, that are properly positioned by means of positioning pins 396. Plastic material supplied through the sprue 397 from the injection molding equipment is arranged to enter the channels 398 that are of similar configuration as the design cut into the stencil 390. The plastic material adheres to the sand-blasted portions of the part, but is readily removed from all other portions thereof.

A plastic design may also be inlaid in a part, as shown in FIGS. 46 and 47. A shoe upper, fore-part 400, is shown with a series of spaced inserts or inlays 401 extending across the toe portion thereof. As more clearly shown in FIG. 47, these inlays are flush with the upper surface of the part, but extend beneath the supporting portions of the part in an enlarged head 402 which prevents the inserts from being removed outwardly from the top of the part. In applying this design, the part is perforated by any suitable means, such as by a punch press, after which the part may be suitably clamped and plastic applied to the respective openings. Since the plastic will adhere only to the roughened surfaces within the openings and to the skin side or underside of the finished leather, any excess material deposited upon the upper finished surface thereof may be readily removed so as to present a perfectly defined design thereon.

The foregoing methods may also be used to provide three dimensional ornamentation of the particular part. Referring to FIG. 48, a part 404 is shown with an embossed rib 405 along the upper or outer surface thereof. Embossed ribs are frequently used in the uppers of shoes and other articles made of sheet material, but ordinarily such ribs do not hold their shape since they are unsupported. In some cases, external stitching is used to provide adequate support for such ribs. By applying a filler 406 to the interior of the ribs 405, adequate support is provided so that the ribs maintain their shape and provide a very desirable effect. Such filler 406 is applied to the part in accordance with the present invention, by first embossing the desired design on the part. The particular part is then clamped between suitable members of a mold assembly, in which means are provided for supplying the interiors of such embossed ribs with a fluid plastic material. The plastic material adheres to the skin side of the leather and rigidly maintains the shape of the design.

Methods of operation

It will be recognized that in accordance with the present invention, all of the various features proposed need not be used simultaneously, as each may be used in accordance with the purposes and results desired. Therefore, it will be recognized that the clamping apparatus described may be used in connection with any or all of the molding and ornamentation procedures, using the principles of injection molding described in connection with the apparatus or in using the packet insert means of supplying a plastic material to the portions to be molded. Regardless of which method of supplying material to the parts is resorted to, the clamping apparatus that carries the mold members may be used to compress, form, and shape the respective molded parts.

The ornamentation procedures described may be used in connection with parts manufactured in accordance with the present invention, or may be used merely to apply such ornamentation to articles manufactured in accordance with other procedures. While the turret is desirable in the manufacture of footwear, such may be applied to the manufacture of the various other types of articles which lend themselves to mass production methods, such as apparel belts, for instance. Similarly, while the aforementioned methods and apparatus have been substantially restricted to considerations involving the manufacture of footwear, it will be recognized that these identical methods and apparatus may be used in connection with the manufacture of any other similar article.

Therefore, while this invention has been described with particular reference to the forms shown in the drawing, it is to be understood that such showing is for illustrative purposes only and is not to be construed as imparting limitations upon the present invention, which is best defined by the claims appended hereto.

Having thus described my invention, what I claim as new and desire to secure by Letter Patent is:

1. Apparatus for preforming a shoe-upper part comprising, in combination, clamping means for holding and sealing the perimeter of at least one portion of said shoe-upper part to a shape, with another portion of said shoe-upper part extending outwardly of said clamping means and within the path of a wiping means, means for injecting a qauntity of plastic material into securing engagement with both of said portions, said clamping means defining the shape of said one portion to said shoe-upper part, and a wiping means associated with said clamping means arranged to fix said other portions of said article to a shape independently of the shaping of said one portion by said clamping means.

2. Apparatus as set forth in claim 1, wherein automatic means are associated with at least said clamping and wiping means for sequentially controlling the shaping of said article.

3. In forming apparatus for shaping an article of manufacture, a pressure injection device for introducing a predetermined quantity of plastic material into association with at least a portion of said article comprising, in combination, a longitudinal pressure cylinder, a fluid pressure actuated ram arranged for longitudinal movement within said cylinder, plastic material supply means for delivering a predetermined quantity of said material to the interior of said cylinder, a transversely extending hollow fluid plastic delivery housing supported within one extremity of said pressure cylinder, a spindle supported for reciprocation slidable movement within said housing being normally spring biased for movement towards one end thereof, duct means communicating with the interior of said cylinder and the interior of said housing, a first peripheral recess on said spindle in communication with said duct means, a second peripheral recess on said spindle spaced longitudinally in one direction from said first recess, said spindle having a longitudinal bore, a plurality of radial bores communicating with said second recess and said longitudinal bore of said spindle, and fluid pressure means communicating with said ram to selectively move said ram toward said duct means, whereby said ram is operative to force said material through said duct means into engagement with said first recess to effect longitudinal movement of said spindle in a direction opposite to said one direction sufficiently to bring said second recess into registry with said duct means, thereby permitting the flow of material through said longitudinal bore of said spindle.

4. Forming apparatus for shaping an article of manufacture comprising, in combination, a U-shaped support having a pair of spaced parallel facing inner side surfaces and a pair of angularly related facing inner base surfaces, a pair of arms pivotally mounted between said respective facing surfaces, the outer surfaces of each of said pair of arms comprising a first surface similar to and normally disposed in engagement with one of said pair of parallel surfaces of said support and a second angularly related surface adapted to be engaged with one of said angularly related surfaces of said support, the included angle between each said base surface and said side surface of said support being greater than the included angle defined by said first surface and said angularly related surface of each said arm, spring means normally urging said first surface of said arm into engagement with said respective parallel side surfaces of said support, whereby said arms in response to abutment with an article of manufacture are adapted to rotate said angularly related surfaces thereof into engagement with said angularly related surfaces of said support.

5. An injecting device for injecting plastic material into pockets formed in shoe-uppers and other articles of manufacture, comprising a needle, a holder for said needle, said holder being slidably mounted in a support which is mounted adjacent a mold adapted to receive a shoe upper, a channel formed in said holder for a communication with said needle, a shoulder on said holder, a source of fluid plastic material under pressure communicating with said shoulder to urge the holder in the direction of said mold in order to advance the needle into a pocket formed in an upper supported by said mold, and a passageway formed in said holder through which said fluid plastic material may enter said channel to be forced therethrough and through the needle into said pocket when said holder reaches its advanced position under the pressure of said fluid plastic material.

6. An injecting device in accordance with claim 5, wherein a chamber for the fluid plastic material under pressure is formed in the support for said needle holder in communication with the shoulder on said holder, whereby fluid plastic material entering said chamber under pressure is adapted to press upon said shoulder in order to advance the holder to such position wherein its needle projects into the pocket in said upper, said passageway in the needle holder comprising a transverse channel communicating at one end with said first mentioned channel and at its opposite end with said chamber.

References Cited by the Examiner

UNITED STATES PATENTS

| | | | |
|---|---|---|---|
| 1,935,102 | 11/33 | Stewart | 12—66 |
| 2,193,191 | 3/40 | Dow et al. | 12—53.5 |
| 2,199,210 | 4/40 | Scherer. | |
| 2,470,089 | 5/49 | Booth | 18—59 |
| 2,499,783 | 3/50 | Scharffenberg | 12—66 |
| 2,600,507 | 6/52 | Leahy et al. | 18—5 |
| 2,880,525 | 4/59 | Weinstein | 36—45 |
| 2,915,835 | 12/59 | Snitzer | 36—45 |
| 2,961,707 | 11/60 | Stewart | 18—34 |
| 2,975,480 | 3/61 | Yanush | 18—34 |
| 3,031,723 | 5/62 | Bandon | 18—59 |

MICHAEL V. BRINDISI, *Primary Examiner.*

MORRIS LIEBMAN, *Examiner.*